United States Patent
Ferguson et al.

(10) Patent No.: US 7,278,567 B2
(45) Date of Patent: Oct. 9, 2007

(54) SYSTEMS AND METHODS FOR SELF-SERVICE DISPATCH

(75) Inventors: Alan Lewis Ferguson, Peoria, IL (US); Trent Ray Meiss, Eureka, IL (US); Brian Lane Jenkins, Washington, IL (US); Steven Wayne O'Neal, Bartonville, IL (US); Daniel Craig Wood, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 10/924,864

(22) Filed: Aug. 25, 2004

(65) Prior Publication Data

US 2006/0080442 A1    Apr. 13, 2006

(51) Int. Cl.
*G06F 17/00* (2006.01)
(52) U.S. Cl. .................. 235/375; 235/451
(58) Field of Classification Search ............ 235/375, 235/492, 451; 701/29–33
See application file for complete search history.

(56) References Cited

U.S. PATENT DOCUMENTS

| | | | |
|---|---|---|---|
| 5,250,761 A | 10/1993 | Koyanagi | |
| 5,815,071 A | 9/1998 | Doyle | |
| 5,848,368 A | 12/1998 | Allen et al. | |
| 5,995,898 A | 11/1999 | Tuttle | |
| 6,112,152 A | 8/2000 | Tuttle | |
| 6,172,602 B1 | 1/2001 | Hasfjord | |
| 6,246,932 B1 | 6/2001 | Kageyama et al. | |
| 6,339,736 B1 | 1/2002 | Moskowitz et al. | |
| 6,351,697 B1 | 2/2002 | Baker | |
| 6,496,775 B2 | 12/2002 | McDonald, Jr. et al. | |
| 6,539,301 B1 | 3/2003 | Shirk et al. | |
| 6,549,833 B2 | 4/2003 | Katagishi et al. | |
| 6,662,091 B2 | 12/2003 | Wilson et al. | |
| 6,678,612 B1 | 1/2004 | Khawam | |
| 6,882,911 B2 * | 4/2005 | Hayakawa et al. | ........... 701/29 |
| 2002/0156558 A1 | 10/2002 | Hanson et al. | |
| 2003/0001736 A1 | 1/2003 | Lewis | |
| 2003/0125845 A1 | 7/2003 | Carlstedt et al. | |
| 2003/0158640 A1 | 8/2003 | Pillar et al. | |
| 2004/0021563 A1 | 2/2004 | Mahoney et al. | |

FOREIGN PATENT DOCUMENTS

| | | |
|---|---|---|
| DE | 10126527 | 12/2002 |
| EP | 1387307 | 2/2004 |
| WO | WO 00/41104 | 7/2000 |
| WO | WO 01/73632 | 10/2001 |

* cited by examiner

*Primary Examiner*—Daniel Stcyr
(74) *Attorney, Agent, or Firm*—Finnegan, Henderson, Farabow, Garrett & Dunn

(57) ABSTRACT

Systems and methods are disclosed that process service requests associated with one or more work machines. In one embodiment, a process is disclosed that includes receiving status information associated with operations of the first work machine and analyzing a first work machine flow sequence associated with the first work machine based on the status information. Based on the analysis, a service request is generated. To fulfill the service request, the process may include modifying a second work machine flow sequence associated with a second work machine.

30 Claims, 4 Drawing Sheets

FIG. 4

SYSTEMS AND METHODS FOR SELF-SERVICE DISPATCH

TECHNICAL FIELD

The disclosure relates generally to self-servicing of equipment, and more particularly to systems and methods for allowing work machines to send, receive, and process service requests in a work environment.

BACKGROUND

An important feature in modern work machines (e.g., fixed and mobile commercial machines, such as construction machines, fixed engine systems, marine-based machines, etc.) is the on-board network and associated machine control modules. An on-board network includes many different modules connected to various types of communication links. A machine control module may monitor and/or control one or more components of the work machine. The control module may also receive data from and transmit data to external systems.

Current conventional systems provide on-board modules to monitor vehicle maintenance parameters and provide a signal to an off-board system. Based on the signal, the off-board system dispatches service to the vehicle. One such system is disclosed in U.S. Pat. No. 6,339,736 ("the '736 Patent"), which discloses a system for distributing services, including a computer device within a vehicle, a vehicle monitoring system coupled to the computer device, and a communication system coupled to the computer device for outputting a signal with the vehicle monitoring system data. The system also includes a remote service center computer device that receives the signal with the vehicle monitoring system data. In response to receiving the signal, the remote service center computer device dispatches a service vehicle.

Although the system described in the '736 patent provides means for monitoring the service needs of a vehicle and transmitting a signal to a remote service center, which dispatches a service vehicle, the '736 patent does not disclose monitoring the work machine performance and analyzing a work machine flow sequence to determine a service request associated with the work machine. Further, the '736 patent does not disclose modifying the work machine flow sequence of one or more work machines to fulfill the service request based on the analyzed work machine flow sequence and the monitored work machine performance.

Methods, systems, and articles of manufacture consistent with certain disclosed embodiments may solve one or more of the problems set forth above.

SUMMARY OF THE INVENTION

Systems and methods are disclosed that process service requests associated with one or more work machines. In one embodiment, a process is disclosed that includes receiving status information associated with operations of the first work machine and analyzing a first work machine flow sequence associated with the first work machine based on the status information. Based on the analysis, a service request is generated. To fulfill the service request, the process may include modifying a second work machine flow sequence associated with a second work machine.

In another embodiment, an on-board control system for a work machine is disclosed that includes a control module that is configured to monitor an operation of the first work machine. Further, the system may include an interface control system that is operable to analyze a first work machine flow sequence associated with the first work machine. Based on the analysis, the interface control system may generate a service request associated with the first work machine. Additionally, the interface control system may be operable to send the service request to an remote system to fulfill the service request.

BRIEF DESCRIPTION OF THE DRAWINGS

The accompanying drawings, which are incorporated in and constitute a part of this specification, illustrate several embodiments and together with the description, serve to explain the principles of the disclosed communication system. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
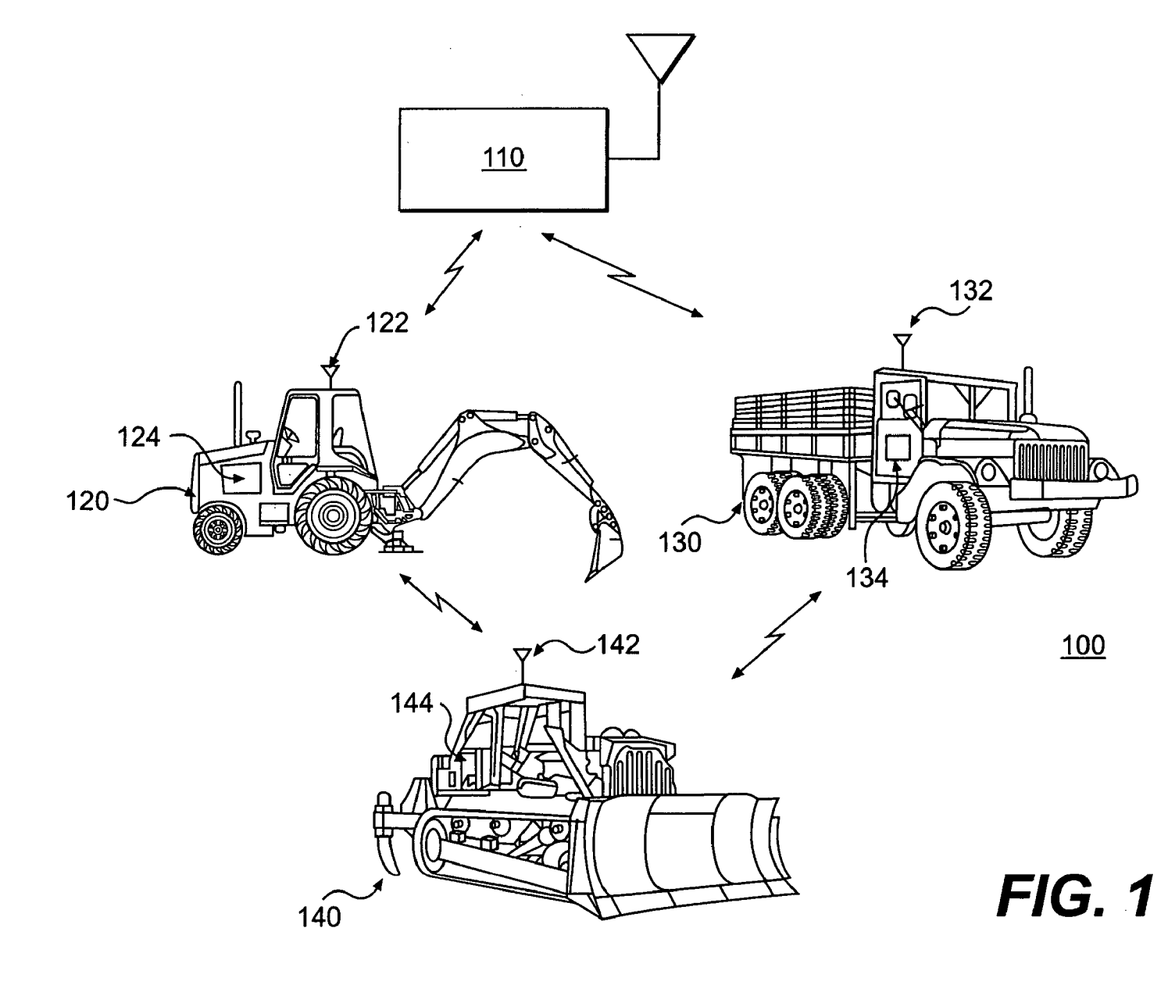
FIG. 1 illustrates a diagrammatic diagram of an exemplary work machine environment consistent with certain disclosed embodiments.

FIG. 1 illustrates an exemplary work machine environment 100 in which features and principles consistent with certain disclosed embodiments may be implemented. As shown in FIG. 1, work machine environment 100 may include a remote off-board system 110 and work machines 120, 130, and 140. Each work machine 120, 130, and 140 may include a wireless communication device, such as antennae 122, 132, and 142, and an on-board system 124, 134, and 144, respectively. Although only a specific number of work machines are shown, environment 100 may include any number and types of such machines and/or off-board systems.

Work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, work machines 120 is a backhoe type work machine, work machine 130 is a hauler-type work machine, and work machine 140 is a earth moving type work machine. The types of work machine illustrated in FIG. 1 are exemplary and not intended to be limiting. It is contemplated that environment 100 may implement any number of different types of work machines.

An off-board system, as the term is used herein, may represent a system that is located remote from work machines 120, 130, and 140. An off-board system may be a system that connects to the work machines through wireline or wireless data links. Further, an off-board system may be a computer system including known computing components, such as one or more processors, software, display, and interface devices that operate collectively to perform one or more processes. Alternatively, or additionally, an off-board system may include one or more communication devices that facilitate the transmission of data to and from the work machines. In certain embodiments, an off-board system may be another work machine remotely located from work machine 120.

Remote off-board system 110 may represent one or more computing systems associated with a business entity corresponding to work machines 120, 130, and 140, such as a manufacturer, dealer, retailer, owner, project site manager, a department of a business entity (e.g., service center, operations support center, logistics center, etc.), or any other type of entity that generates, maintains, sends, and/or receives information associated with machines 120, 130, and 140. One or more of the aforementioned entities may be a third party provider of services and may be unassociated with the work machine manufacturer.

Remote off-board system 110 may include one or more computer systems, such as a workstation, personal digital assistant, laptop, mainframe, etc. Remote off-board system 110 may include Web browser software that requests and receives data from a server when executed by a processor and displays content to a user operating the system. In one embodiment of the disclosure, remote off-board system 110 is connected to work machine 120 through a local wireless communication device. Remote off-board system 110 may also represent one or more portable, or fixed, service systems that perform diagnostics and/or service operations that include receiving and sending messages to work machine 120. For example, remote off-board system 110 may be an electronic testing device that connects to work machine through an RS-232 serial data link or through wireless communication mediums.

Wireless communication devices 122, 132, and 142 may represent one or more wireless antennae configured to send and/or receive wireless communications to and/or from remote systems, such as off-board system 110 and other work machines. Although devices 122, 132, 142 are shown being configured for wireless communications, other forms of communications are contemplated. For example, work machines 120, 130, and 140 may exchange information with remote systems using any type of wireless, wireline, and/or combination of wireless and wireline communication networks and infrastructures. As shown in FIG. 1, work machine 120 may wirelessly exchange information with work machines 130 and 140, and off-board system 110. Further, work machines 130 and 140 may exchange information with off-board system 110 and work machine 120.

Figure 2:
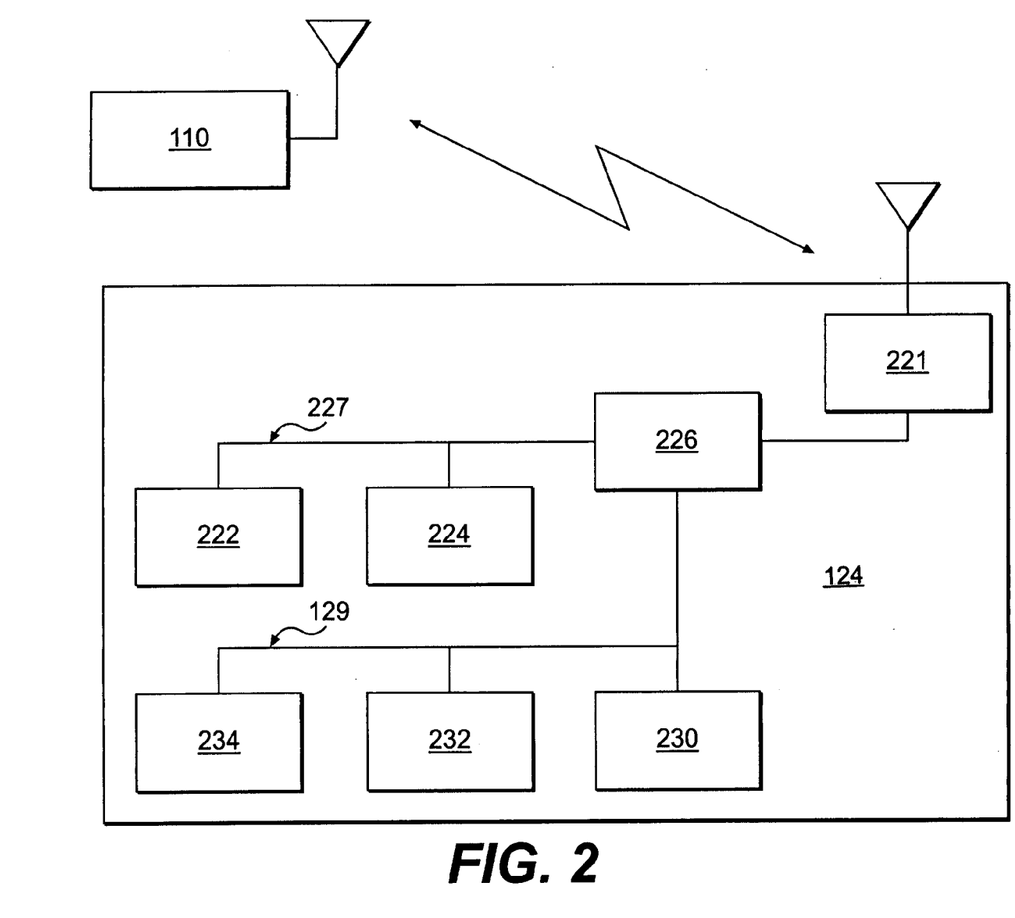
FIG. 2 illustrates a block diagram including exemplary components of the on-board systems of FIG. 1.

On-board systems 124, 134, and 144 may represent a system of one or more on-board modules, interface systems, data links, and other types of components that perform machine processes within work machines 120, 130, and 140. FIG. 2 shows a block diagram of on-board system 124 consistent with certain disclosed embodiments. The following description of on-board system 124 is applicable to on-board systems 134 and 144.

As shown in FIG. 2, on-board system 124 may include a communication module 221, an interface control system 226, and on-board modules 222, 224, 230, 232, and 234, respectively connected to primary and secondary on-board data links 227 and 229. Although interface control system 226 is shown as a separate entity, some embodiments may allow control system 226 to be included as a functional component of the one or more on-board modules. Further, although only a specific number of on-board control modules are shown, system 124 may include any number of such modules.

An on-board module, as the term is used herein, may represent any type of component operating in a work machine that controls or is controlled by other components or sub-components. For example, an on-board module may be an operator display device, an Engine Control Module (ECM), a power system control module, a Global Positioning System (GPS) interface device, an attachment interface that connects one or more sub-components, and any other type of device that work machine 120 may use to facilitate operations of the machine during run time or non-run time conditions (i.e., machine engine running or not running, respectively).

Communication module 221 represents one or more devices that is configured to facilitate communications between work machine 120 and an off-board system, such as remote off-board system 110. Communication module 221 may include hardware and/or software that enables the module to send and/or receive data messages through wireline or wireless communications. Communication module 221 may also include one or more wireless antennae for facilitating wireless communications with remote off-board system 110, although other off-board systems may send and receive data messages to and from communication module 221. The wireless communications may include satellite, cellular, infrared, and any other type of wireless communications that enables work machine 120 to wirelessly exchange information with an off-board system.

Modules 222 and 224 represent one or more on-board modules connected to a primary data link 227 included in work machine 120. Primary data link may represent a proprietary or non-proprietary data link, such as Society of Automotive Engineers (SAE) standard data link including Controller Area Network (CAN), J1939, etc. Primary data link 227 may be wireless or wired. For example, in one embodiment, work machine 120 may include wireless sensors that are linked together through interface control system 226. The term "primary data link" is not intended to be limiting. That is, "primary" refers to a data link for designation purposes only, and does not infer primary functionality associated with the data link or any on-board modules connected to the primary data link. However, certain embodiments may arrange on-board modules on specified data links that have different work machine importance in terms of functionality than other on-board modules.

Modules 230, 232, and 234 represent on-board modules connected to a secondary data link 229 within work machine 120. Secondary data link 229 may be a proprietary or non-proprietary data link. Further, secondary data link 229 may be wireless or wired. The term "secondary data link" is not intended to be limiting. That is, "secondary" refers to a data link for designation purposes only, and does not infer secondary functionality associated with the data link or any on-board modules connected to the secondary data link. However, certain embodiments may arrange on-board modules and interface control system 226 on specified data links that have different work machine importance in terms of functionality than other on-board modules.

On-board modules 222, 224, 230, 232, and 234 may include one or more processing devices and memory devices for storing data executed by the processing devices (all not shown). In one embodiment, on-board modules 222, 224, 230, 232, and 234 may include software that is stored in a rewritable memory device, such as a flash memory. The software may be used by a processing device to control or monitor a particular component or process of work machine 120, such as an engine component. In certain embodiments, the software is modifiable through commands received by the processing devices over respective data links 227 and 229.

Interface control system 226 represents an on-board interface device configured to perform functions consistent with embodiments of the work machine. Interface control system 226 may be configured with various types of hardware and software depending on its application within work machine 120. Thus, in accordance with certain embodiments, interface control system 226 may provide interface capability that facilitates the transmission of data to and from communication module 221 and on-board modules 222, 224, 230, 232, and 234. Further, interface control system 226 performs various data processing functions and maintains data for use by one or more on-board modules or off-board systems. For example, interface control system 226 may be configured to perform protocol conversions (e.g., tunneling and translations) and message routing services for on-board data links.

For clarity of explanation, FIG. 2 depicts interface control system 226 as a distinct element. However, interface control functionality may be implemented via software, hardware, and/or firmware within one or more modules (e.g., 222 and 224) on an on-board data link. Thus, interface control system 226 may, in certain embodiments, represent functionality or logic embedded within another element of work machine 120.

In one embodiment, interface control system 226 may include various computing components used to perform certain functions consistent with the requirements of that embodiment. To do so, interface control system 226 may include one or more processors and memory devices (not shown). For example, interface control system 226 may include a digital core that includes the logic and processing components used by interface control system 226 to perform interface, communications, software update functionalities, and software driver selection. In one embodiment, the digital core may include one or more processors and internal memories. The memories may represent one or more devices that temporarily store data, instructions, and executable code, or any combination thereof, used by a processor. Further, the memories may represent one or more memory devices that store data temporarily during operation of interface control system 226, such as a cache memory, register device, buffer, queuing memory device, and any type of memory device that maintains information. The internal memory used by interface control system 226 may be any type of memory device, such as flash memory, Static Random Access Memory (SRAM), and battery backed non-volatile memory devices.

In operation, the digital core may execute program code to facilitate communications between on-board modules and/or off-board systems. In one embodiment, interface control system 226 may include software that performs protocol conversion operations for converting information associated with one type of data link to another. The conversion operations may include protocol translation and tunneling features.

In accordance with certain embodiments, interface control system 226 may be configured to perform one or more processes that allow work machine 120 to send, receive, and process service request through self service dispatch messages. A service request may be associated with one or more work machine flow sequences corresponding to one or more tasks being performed in or between work environments. To better illustrate these embodiments, consider work environment 300 shown in FIG. 3 that includes off-board system 110 and work machines 310, 320, and 330. As shown, work machines 310, 320, and 330 may each include on-board systems 302, 304, and 306, respectively, that correspond to on-board system 124 described above in connection with FIG. 2. Further, although work machines 320 and 330 are shown as certain types of work machines that are different from that of work machine 310, the disclosed embodiments may be implemented with a number of different types of work machines, including machines of all the same or different types.

In operation within work environment 300, work machines 310, 320, and 330 may be assigned and perform one or more tasks that collectively result in the performance of a work environment flow sequence for work environment 300. For example, in a road paving work environment, a first work machine may be assigned a task for delivering or removing consumable materials to or from a dedicated location within the work environment and/or to/from another work machine or site, while another work machine may be assigned a task for performing a paving operation using the consumable materials delivered by the first machine. For instance, in FIG. 3, work machine 310 may be a machine that delivers asphalt to work machines 320 and/or 330 for performing a road paving operation. Accordingly, each work machine 310, 320, and 330 is assigned one or more tasks that are associated with a work environment flow sequence, such as the aforementioned road paving operation.

The term consumable material(s) or material(s), as described herein, refers to any type of tangible things that may be manipulated, transported, and/or off-loaded by/from a work machine. The term may include natural and unnatural resources (i.e., man-made goods), such as fuel, oils, water, and other types of fluids, chemicals, etc., wood in manufactured or un-manufactured states, earth (e.g., dirt, ores, rocks, etc.), farming materials (e.g., feed, crops, etc.), and any other type of tangible material that a work machine may move, carry, haul, deliver, etc.

Figure 3:
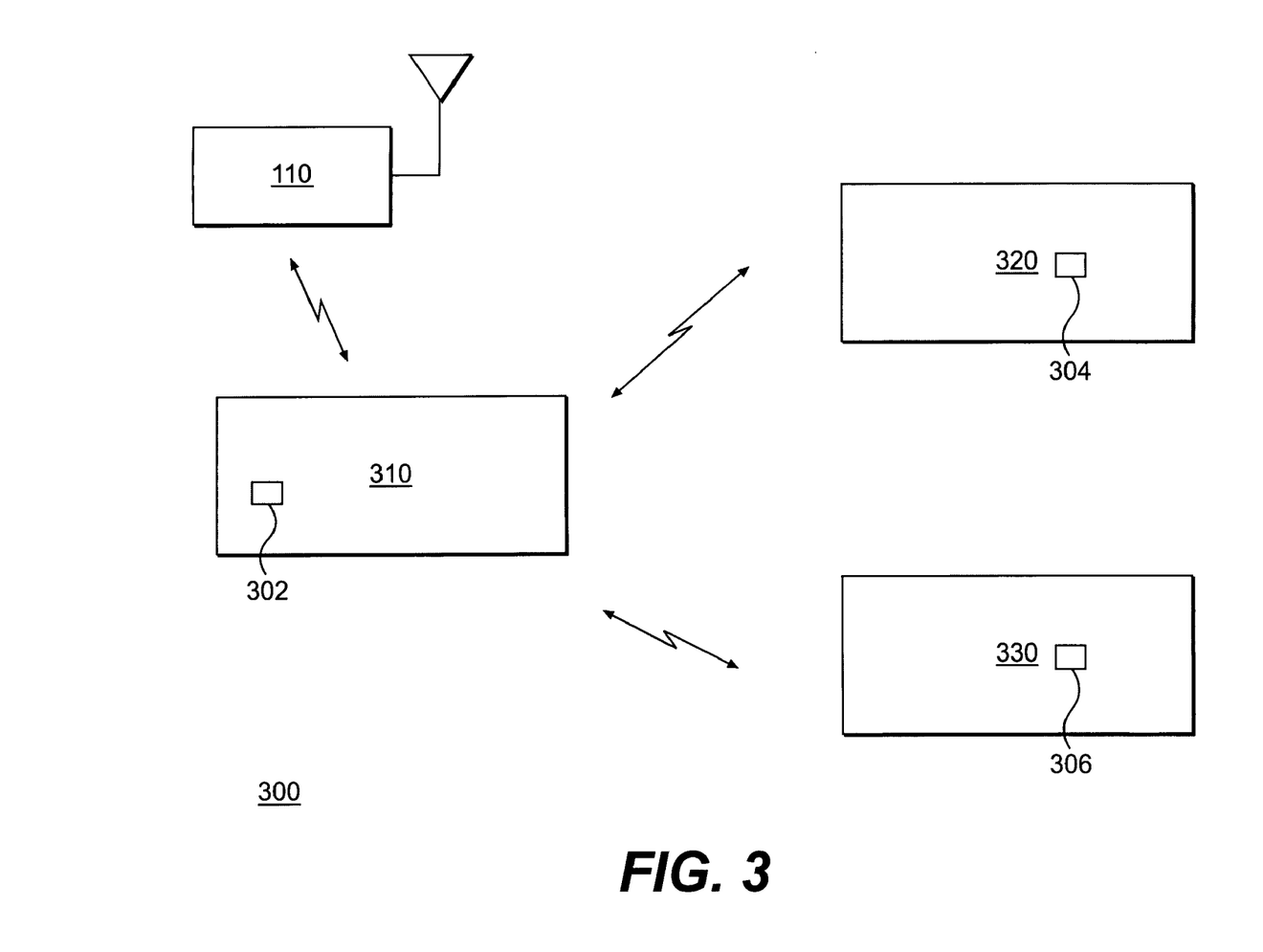
FIG. 3 illustrates another exemplary work machine environment consistent with certain disclosed embodiments.

In accordance with certain embodiments, a work environment flow sequence may include work machine flow sequences associated with one or more of work machines operating in work environment 300, such as work machines 310, 320, and 330. A work machine flow sequence may include a list of tasks for a respective work machine to perform during a specified period of time or according to one or more predetermined specifications. For example, a work machine flow sequence for work machine 320, which may be a paver machine, may include:

1) receiving a certain amount of consumable material (e.g., asphalt) from a material delivery work machine (e.g., machine 310);

2) paving certain distance of road based on the received materials; and 3) requesting additional amounts of materials based on the performance of task step number (2).

Along the same lines, a work machine flow sequence for work machine 310 may include:

1) receiving a certain amount of consumable material from a material supply site;

2) delivering consumable material to predetermined one or more work machines performing tasks within the work environment flow sequence; and 3) traveling to the material supply site to subsequently perform machine flow sequence steps (1) and (2).

Collectively, the work machine flow sequences for machines 310 and 320 may be included in a work environment flow sequence that may include, for purposes of this example:

1) delivering materials to paving machines on an as-needed basis; and
2) paving a certain distance of road in a certain period of time using the delivered material.

Accordingly, a work environment flow sequence depends on the performance of individual work machine flow sequences. For example, referring the above exemplary flow sequence for work environment 300, the first task of delivering materials may include the machine flow sequences of work machine 310, while the second task of work environment flow sequence (i.e., paving a road) may include the machine flow sequences of work machines 320 and/or 330.

Each work machine may perform its assigned tasks by leveraging the functions of their respective on-board modules (i.e., on-board modules 302, 304, and 306). Thus, in the above example, work machine 320 may perform its work machine flow sequence by leveraging one or more on board modules (e.g., modules 222, 224, 230, 232, and 234) included in its on-board system 304. For instance, one or more on-board modules may be used to monitor the level of consumable material received, stored, and/or used, while performing its paving operations. Along the same lines, work machine 310 may leverage one or more on-board modules to monitor the amount of consumable material received from a supply site, the amount of consumable material delivered, and current levels of consumable material being stored and transported. Also, on-board modules 222, 224, 230, 232, and 234 may monitor parameters associated with operations of their respective work machine. The information may be stored in memory devices within each respective on-board module and/or delivered and stored in each machine's respective interface control system (e.g., system 226).

In accordance with another embodiment, while each work machine performs its respective work machine flow sequence, each respective interface control system 226 may be configured to perform a work flow analysis process that analyzes its work machine flow sequence to determine if the work machine requires a service request. The work flow analysis process performed by a work machine may include monitoring sensors or control modules to determine status information associated with one or more parameters of the work machine (e.g., fuel levels, fluid levels, temperature levels, engine speed levels, etc.) and status information concerning material being manipulated or carried by the work machine (e.g., current levels of consumable materials being hauled by the work machine and/or past levels of materials that have been hauled by the work machine). The status information may be stored in a memory device within the work machine's on-board system.

By analyzing the status information and the machine's flow sequence, interface control system 226 may determine whether to generate a service request. The service request may include information indicating a type of service requested by the work machine generating and sending the service request. For example, work machine 320 may issue a request message directed to another work machine (e.g., work machine 310) and/or off-board system 110 to provide consumable material (e.g., rock, dirt, gravel, building material, etc.) and/or work machine service material (e.g., fuel, fluids, etc.) Additionally, the service request may include a request for service to be performed on the work machine itself, such as a request for maintenance based on an analysis of the status information monitored by interface control system 226 Further, the service request may also include a request to modify its own work machine flow sequence or a flow sequence of another work machine to meet the requested services of the work machine issuing the service request.

For instance, work machine 310 may analyze its stored work machine flow sequence by monitoring the list of tasks to be performed by that work machine (e.g., machine 310) and determining whether it is performing tasks within predetermined specifications. For example, work machine 310 may use interface control system 226 to monitor and analyze the work machine's performance for receiving consumable material (e.g., does the work machine reach the supply site within determined time frames and with an empty hopper?), delivering the material (e.g., does the work machine deliver the material to the appropriate target machine and provide the proper amount of material?), etc.

In the event work machine 310 is not performing the analyzed tasks according to predetermined specifications set forth in the work machine flow sequence, interface control system 226 may generate a service request requesting modification of one or more tasks (or attributes of these tasks, i.e., specific values for a task) in order to modify the work machine flow sequence to meet the predetermined specification. By modifying its work flow sequence, work machine 310 may internally fulfill the service request.

In an alternate embodiment, in addition to or instead of internally processing the service request, interface control system 226 may send the service request to one or more remote work machines, such as work machine 320. Upon receipt of the service request, work machine 320 may forward the request to its interface control system 226 for analysis. In this case, machine's 320 interface control system 226 may perform an analysis process that modifies its respective work machine flow sequence based on the service request received from work machine 310, thus allowing work machine 320 in subsequent operations to fulfill the service request.

To better illustrate the above described embodiments, consider the following example. In operation, interface control system 226 of work machine 320 may determine that the machine is not meeting its work machine flow sequence specifications because it is not paving enough road in a determined amount of time. Further, the analysis may indicate that work machine's 320 progress is being impeded because it is not receiving a sufficient amount of consumable material from work machine 310 in a timely manner, thus causing machine 320 to idle while waiting for the delivery of additional material. As a result, work machine 320 may send a service request to work machine 310 requesting that work machine 310 modify its work machine flow sequence by either speeding up the delivery of the material to work machine 320 or providing more material in each subsequent delivery. Based on the service request from work machine 320, interface control system 226 of work machine 310 may determine whether it can or cannot satisfy the demands of machine 320. In the event it can meet the demands of work machine 320, interface control system 226 of machine 310 may modify one or more tasks or task attributes of the work machine flow sequence for machine 310 to meet the requested demands, such as increasing the number of deliveries to machine 320, increasing the amount of material received by the supply site, etc.

In the event work machine 310 cannot satisfy the service request of work machine 320, work machine 310 may generate and send a service request message to another work machine that is capable of satisfying the demand for work machine 320. Alternatively, or additionally, in the event another work machine has been identified and is capable of supplementing or replacing the tasks performed by work machine 310, work machine 310 may issue another service request to another work machine that may need materials being carried by machine 310, such as work machine 330. If the other work machine (i.e., machine 330) accepts the service request, it may acknowledge this acceptance to machine 310 through its own service request message. In response, work machine 310 may modify its work flow machine sequence to identify the new target work machine (i.e., machine 330) along with any delivery requirements indicated by the new work machine.

In another embodiment, work machines 310, 320, and 330 may directly communicate with off-board system 110 to satisfy a service request by transmitting a service request message directly or indirectly to off-board system 110 to fulfill the service request. For example, off-board system 110 may be a service site that schedules and manages the operations of one or more of work machines 310, 320, and 330, such as a managing site that tracks the work environment flow sequence and work machine flow sequences, and in some instances, initiates changes to one or more of these flow sequences. Further, off-board system 110 may be associated with a service site that provides services for work machines 310, 320, 330, such as a fuel or maintenance service site that schedules and dispatches service machines to a target work machine requesting service (e.g., low on fuel, etc.). For instance, off-board system 110 may automatically, or in response to user input, schedule delivery of consumable materials and/or service to a work machine or provide a command message to an operator of a work machine to dispatch consumable materials and/or service to another work machine or location within a work environment.

In some embodiments, off-board system 100 may associated with an entity not affiliated with an entity that is associated with one or more work machines 310, 320, and/or 330. For example, work machines 310, 320, and 330 may be managed, owned, and/or leased by a first business entity, while off-board system 110 may be associated with a second business entity that is not affiliated with the first business entity, such as a third party service contractor.

In an alternate or additional embodiment, to satisfy the service request, work machines 310, 320, and 330 may communicate with one or more intermediary work machines before communicating with off-board system 110. For example, work machine 320 may transmit a service request destined for off-board system 110 to work machine 310. Consequently, work machine 310 may analyze the received service request and determine that the request is targeted to off-board system 110. Accordingly, work machine 310 may forward the service request to off-board 110 for fulfillment of the request.

Figure 4:
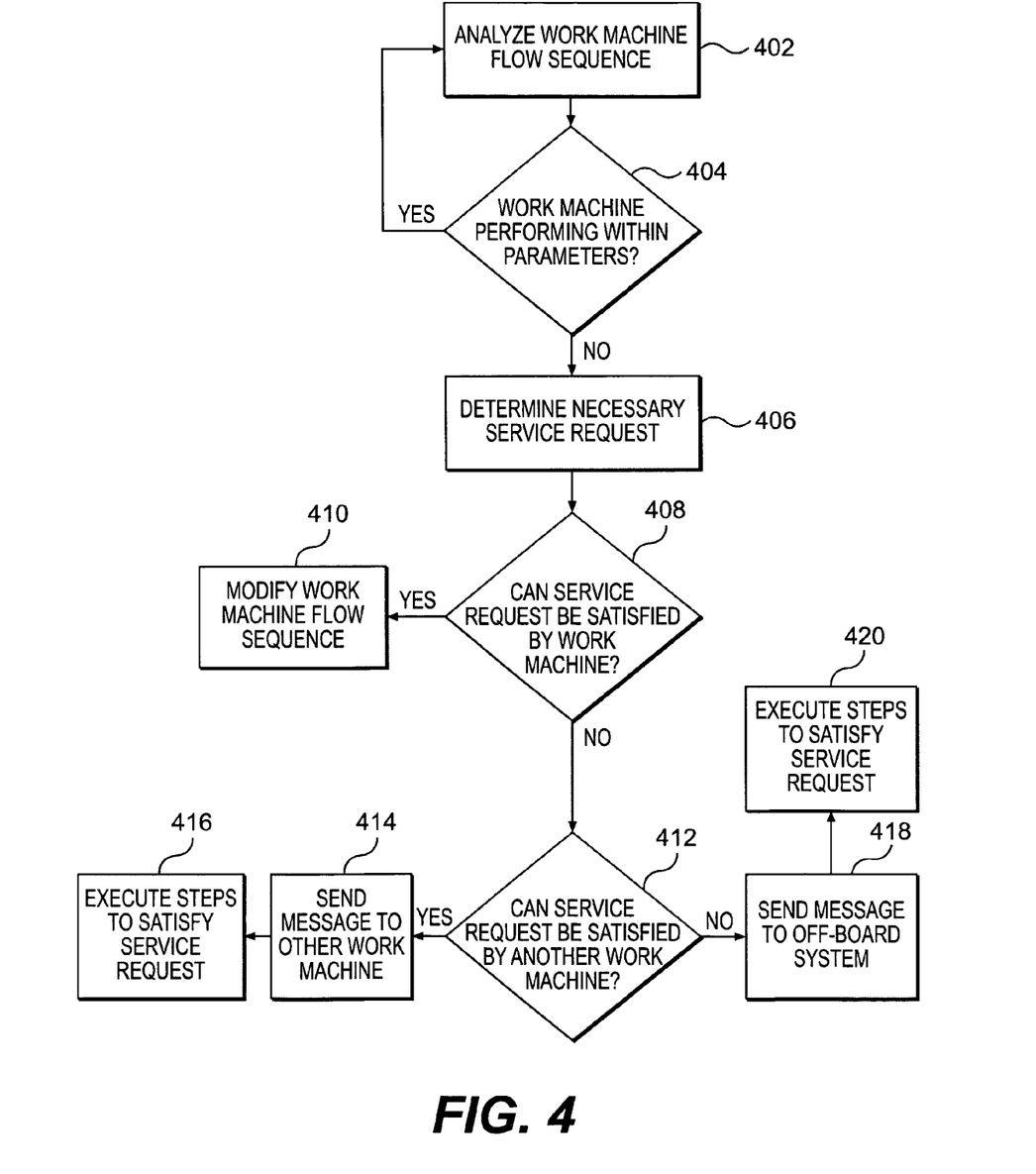
FIG. 4 illustrates a flow chart of an exemplary self-service dispatch process consistent with certain disclosed embodiments.

As explained, the disclosed embodiments enable a work machine to perform self-service dispatch functions to either request services or process service requests received from remote work machines or off-board system 110. FIG. 4 shows a flowchart of an exemplary self-service dispatch process 400 that may be performed by an on-board system (e.g., on-board system 124), consistent with certain disclosed embodiments. Initially, on-board system 124 may determine whether a service request is received by interface control system 226 (Step 401). If no service request is received (Step 401; NO), on-board system 124 may analyze the status information associated with one or more operation parameters or work machine components and/or the machine's stored work machine flow sequence in a manner consistent with that described above (Step 402). For instance, on-board system 124 may analyze the task list included in the machine's work machine flow sequence to determine whether the work machine is performing its tasks according to predefined specifications associated with the machine flow sequence. Additionally, or alternatively, on-board system 124 may analyze status information to determine whether the work machine requires service itself, such as additional fuel, fluids, or other forms of service.

Based on the analysis, on-board system 124 may determine whether a service request is required (Step 404). If no service request is required, (Step 404; NO) the self-service dispatch process may return to Step 402. If, however, a service request is required (Step 404; YES), on-board system 124 may determine the type of service request to generate in order to correct any deviations from the work machine flow sequence and/or attend to any services the work machine may require (Step 406).

Once the type of service request is received or determined, on-board system 124 may determine whether the service request may be processed by the work machine itself (Step 408). If the service request may be processed by the work machine (Step 408, YES), the work machine processes the service request (Step 410). In one embodiment, the work machine may process the service request based on the type of service request generated by on-board system 124. For example, on-board system 124 may modify the machine's flow sequence to allow the work machine to process the service request. For instance, if the work machine flow sequence initially requires the machine to deliver materials to a target location and the service request indicates that additional fuel is required before reaching the target location, on-board system may modify the work flow sequence to allow the work machine to request or obtain fuel more frequently, such as adding another task in the task list for additional fuel stops during its flow sequence. Alternatively, if the service request requires service to be performed by an operator of the machine, such as performing a maintenance check of a component of the machine, on-board system 124 may provide a message to the operator indicating this information. The above examples are not intended to be limiting, and other types of procedures and processes may be performed by on-board system 124 to internally process a service request.

Returning to Step 408, if on-board system 124 determines that the service request is not to be processed by the work machine itself (Step 408; NO), system 124 may determine whether the service request may be processed by another work machine (Step 412). If the service request may be processed by another work machine (Step 412, YES), the target work machine is identified and the service request is transmitted to the target work machine through communication module 221 (Step 414). The target work machine may receive the service request and subsequently process the service request (Step 416).

In certain embodiments, processing a service request by the target work machine may include modifying the target work machine's stored work machine flow sequence to handle any requests identified in the service request. For example, work machine 320 may be a road paving machine that requests additional consumable material from work machine 310 operating as an asphalt delivery machine.

Accordingly, work machine 320 may identify work machine 310 as a target work machine.

Upon receiving the service request for additional material, work machine 310 may modify its work machine flow sequence to add a delivery of material to work machine 310. This modification may include deviating from less priority based delivery locations or machines identified in work machine's 310 work machine flow sequence. Further, modifying the flow sequence may include adding a task for receiving additional material from a service supply point in different delivery cycles to compensate for the added demand of materials from work machine 320.

Other forms of work machine flow sequence modifications are contemplated and are not limited to the examples described above. Depending on the type of target work machine and the type of service request, the target work machine may process the received service request in different manners. For instance, in the event the target work machine determines that it cannot process the service request, its on-board system may forward the service request to another remote work machine or to off-board system 110 for subsequent processing. It should be noted that results of the processed service request, including modified flow sequences, may be provided to the operator of the work machine to implement the resulting changes (i.e., change delivery targets, travel to a different destination, delivery materials to a new target machine, etc.).

Returning to Step 412, in the event on-board system 124 determines that the service request cannot be processed by another work machine (or that off-board system 110 is the target of the service request) (Step 412; NO), a message may be sent to off-board system 110 (Step 418). Based on the information included in the service request, off-board system 110 may process the service request (Step 420). Processing the service request may include processes similar to those described above in connection with Step 416. Further, processing a service request by off-board system 110 may include modifying a work environment work flow sequence based on the type of services requested by the work machine. For example, if the service request indicates that the work machine requires additional material, fuel, or services, off-board system 110 may initiate a process for handling the requests and/or adjust the work environment flow sequence to allow the service requests to become part of the environment flow sequence, such as scheduling delivery of consumables/service to the work machine or provide a message to an operator of a service work machine to dispatch consumables/service to the work machine that issued the service request.

Additionally, off-board system 110 may send messages to one or more work machines in work environment 300 to modify their work machine flow sequences based on any changes made to the work environment flow sequence. For instance, off-board system 110 may send a message to a fuel service delivery work machine to alter its planned route to service a work machine that issued a fuel service request. Along with the directive to service the requesting work machine, the message may include commands that direct the fuel service delivery machine to modify its work machine flow sequence to add the requesting machine as a delivery task. Along the same lines, any other work machines in work environment 300 that may be affected by the change to the work environment flow sequence, or to work machine's flow sequence, may also receive commands for altering their respective flow sequences, if applicable.

INDUSTRIAL APPLICABILITY

Methods and systems consistent with the disclosed embodiments enable a work machine to receive, process, or issue service requests in a work environment. Each work machine may determine whether service is needed while performing tasks according to a predefined work machine flow sequence. Based on the determined service, a service request is generated that includes information reflecting the type of service desired by that machine. If the work machine cannot process the service request itself, it may forward the request to another work machine or to an off-board system for subsequent processing. For example, the receiving work machine may process the service request by modifying its respective work machine flow sequence to handle the request (i.e., change delivery sequences to compensate for the service request). The off-board system may process the service request by modifying a work environment flow sequence that includes a number of work machine flow sequences that result in an operation task that is performed at a work environment. For instance, the off-board system may schedule material or service deliveries to the requesting work machine, thus adjusting one or more tasks included in the work environment flow sequence. Accordingly, a service request may be processed or issued by a work machine while operating in a work environment, thus promoting efficiency and autonomy between machines and the off-board system in performing the work environment flow sequence.

Although embodiments have been disclosed in connection with certain types of machines and operations, any type of work machine performing any type of task may be implemented within a work environment flow sequence. Further, the disclosed embodiments are not limited to implementing flow sequences. That is, work machines may implement methods and systems consistent with the disclosed embodiments in order to request and receive services without adjusting or analyzing flow sequences. For example, work machine 310 in FIG. 3 may receive indications of certain maintenance events and thus requests certain types of services. On-board system 302 may issue a service request to a dispatch center that directs a service machine to the location or a designated location associated with work machine 310. Further, the type of service request is not limited to services, such as fuel, fluids, and maintenance services. Embodiments may include services associated with materials manipulated or hauled by a work machine. Thus, if a delivery machine is low on the material being delivered, methods and system as described herein allow the machine to replenish its supply in an efficient manner through the use of service requests.

Further, although embodiments have been disclosed having off-board system 110 being operable to analyze and modify a work environment flow sequence, other embodiments may be implemented that enable one or more work machines 310, 320, and 330 to perform similar functions. For example, work machine 310 may be configured to store and analyze a work environment flow sequence and perform analysis processes based on a service request generated internally (i.e., by work machine 310) or based on service requests received from other work machines (e.g., work machines 320, 330).

Additionally, methods and systems consistent with certain disclosed embodiments may allow a work machine to monitor consumable materials located a certain work site and request removal of the material by another work machine. For example, a first work machine may be configured to receive indications (either through user input or through sensor input) of a level of consumable materials produced at a work site (e.g., a pile of debris or dirt excavated from the site). The first work machine may provide a service request to a second work machine that is configured to remove such material. Accordingly, upon confirming that the second work machine is capable of processing the service request, the second work machine may be dispatched to the work site to remove the consumable material.

Also, certain embodiments may allow a work machine to provide operator interface displays to an operator to configure a particular service request. For example, a first work machine operating at a work site may be implemented with interface software/hardware that displays to an operator of the first work machine a menu or query for types of service request. As a non-limiting example, suppose the first work machine's operator desires to have more material delivered to the work site. The interface software/hardware may provide a menu that queries the operator for the type of material requested. Based on the operator's input, the first work machine may generate a service request that is directed to the appropriate work machine configured to handle the request. In certain embodiments, the processes disclosed in FIGS. 3 and 4 may be implemented to route the service request to the appropriate work machine. Upon receiving the service request, a second work machine may determine it may handle the request for additional material, and thus begin operations to satisfy the request (e.g., load material, travel to the work site, etc.).

Also in certain embodiments, the service requests produced by a work machine may be directed to an off-board system operating as a hub unit used to dispatch the service request to appropriate work machine capable of handling received service request. Alternatively, the service requests may be sent directly to other work machines that are capable of handling the service request.

Other embodiments, features, aspects, and principles of the disclosed exemplary systems may be implemented in various environments and are not limited to work site environment. For example, a work machine with an interface control system may perform the functions described herein in other environments, such as mobile environments between job sites, geographic locations, and settings. Further, the processes disclosed herein are not inherently related to any particular system and may be implemented by a suitable combination of electrical-based components. Embodiments other than those expressly described herein will be apparent to those skilled in the art from consideration of the specification and practice of the disclosed systems. It is intended that the specification and examples be considered as exemplary only, with the true scope of the invention being indicated by the following claims.

What is claimed is:

1. A method for providing service to a first machine, comprising:
   receiving status information associated with operations of the first machine;
   analyzing a first machine flow sequence associated with the first machine based on the status information;
   generating a service request based on the analysis; and
   modifying a second machine flow sequence associated with a second machine to fulfill the service request.

2. The method of claim 1, wherein analyzing the first machine flow sequence includes monitoring a list of tasks to be performed by the first machine.

3. The method of claim 2, wherein modifying the first machine flow sequence includes adjusting the list of tasks to be performed by the first machine.

4. The method of claim 1, further including modifying the second machine flow sequence to fulfill the service request, the method includes:
   transmitting a message to an off-board system; and
   modifying an environment flow sequence to fulfill the service request, wherein the environment flow sequence includes tasks associated with the first and second machine flow sequences.

5. The method of claim 4, further including:
   sending a message to the second machine; and
   modifying the second machine flow sequence to fulfill the service request based on the message.

6. The method of claim 5, wherein the off-board system is associated with an entity that is unaffiliated with an entity associated with at least one of the first and second machines.

7. The method of claim 4, wherein fulfilling the service request with the off-board system includes automatically scheduling delivery of consumable materials or service to the first machine.

8. The method of claim 1, wherein modifying the second machine flow sequence includes:
   adding a task to the second machine flow sequence that directs the second machine to provide a service to the first machine.

9. The method of claim 1, further including:
   providing a message to an operator of the second machine to deliver or remove consumable material or service to the first machine.

10. The method of claim 1, wherein receiving status information includes: collecting, by the first machine, parameter information from one or more on-board modules.

11. An on-board control system for a machine, comprising:
    a control module that is configured to monitor an operation of the first machine: and
    an interface control system operable to:
       analyze a first machine flow sequence associated with the first machine;
       generate a service request associated with the first machine based on the analysis; and
       send the service request to a remote system to fulfill the service request,
    wherein the remote system is a second machine that modifies a second machine flow sequence associated with the second machine to fulfill the service request.

12. The system of claim 11, wherein the interface control system is further operable to:
    receive a remote service request from a remote machine; and
    modify the first machine flow sequence to fulfill the remote service request.

13. The system of claim 12, wherein the first machine is a machine that is operable to provide at least one of services and material to the remote machine.

14. The system of claim 12, wherein the interface control system is further operable to:
    modify an environment flow sequence to fulfill at least one of the service request and the remote service request, wherein the environment flow sequence includes tasks associated with at least one of the first and second machine flow sequences.

15. The system of claim 12, wherein the interface control system is further operable to:
    provide a message to an operator of the first machine to perform a task to fulfill at least one of the service request and the remote service request.

16. The system of claim 15, wherein the task includes at least one of delivering consumable material and providing service to the remote machine.

17. The system of claim 11, wherein the remote system is an off-board system that modifies an environment flow sequence to fulfill the service request, wherein the environment flow sequence includes at least one task included in the first machine flow sequence.

18. The system of claim 17, wherein the off-board system is associated with an entity unaffiliated with an entity associated with the first machine.

19. The system of claim 11, wherein the interface control system is further operable to:
adjust the first machine flow sequence to fulfill the service request.

20. A system for providing service to a first machine, comprising:
means for receiving status information associated with operations of the first machine;
means for analyzing a first machine flow sequence associated with the first machine based on the status information;
means for generating a service request based on the analysis; and
means for modifying a second machine flow sequence associated with a second machine to fulfill the service request.

21. The system of claim 20, wherein the means for analyzing the first machine flow sequence includes means for monitoring a list of tasks to be performed by the first machine.

22. The system of claim 21, wherein the means for modifying the first machine flow sequence includes means for adjusting the list of tasks to be performed by the first machine.

23. The system of claim 20, wherein the system further includes:
means for transmitting a message to an off-board system; and
means for modifying an environment flow sequence to fulfill the service request, wherein the environment flow sequence includes tasks associated with the first and second machine flow sequences.

24. The method of claim 23, further including:
means for sending a message to the second machine; and
means for modifying the second machine flow sequence to fulfill the service request based on the message.

25. The system of claim 24, wherein the off-board system is associated with an entity that is unaffiliated with an entity associated with at least one of the first and second machines.

26. The system of claim 23, wherein the means for fulfilling the service request with the off-board system includes means for automatically scheduling delivery of consumable materials or service to the first machine.

27. The system of claim 20, wherein the means for modifying the second machine flow sequence includes:
means for adding a task to the second machine flow sequence that directs the second machine to provide a service to the first machine.

28. The system of claim 20, further including:
means for providing a message to an operator of the second machine to deliver a consumable material or service to the first machine.

29. The system of claim 20, wherein receiving status information includes:
means for collecting, by the first machine, parameter information from one or more on-board modules.

30. A system for providing service to a first machine, comprising:
a control module that is configured to monitor an operation of the first machine; and
an interface control system including program code that performs a process, when executed by a processor, including the steps of:
analyzing a first machine flow sequence associated with the first machine;
generating a service request associated with the first machine based on the analysis;
sending the service request to a remote system to fulfill the service request;
receiving a remote service request from a remote machine; and
modifying the first machine flow sequence to fulfill the remote service request.

* * * * *